United States Patent [19]

Lödige et al.

[11] Patent Number: 4,681,211
[45] Date of Patent: Jul. 21, 1987

[54] TRANSPORT DEVICE FOR PIECE GOODS OR THE LIKE

[75] Inventors: Rudolf Lödige, Paderborn; Bernhard Leonhard, Warburg-Scherfede; Volker Stille, Baunatal, all of Fed. Rep. of Germany

[73] Assignee: Dipl.-Ing. A. Loedige GmbH, Paderborn, Fed. Rep. of Germany

[21] Appl. No.: 791,361

[22] Filed: Oct. 25, 1985

[30] Foreign Application Priority Data

Nov. 2, 1984 [DE] Fed. Rep. of Germany ....... 3439966

[51] Int. Cl.$^4$ ............................................. B65G 13/06
[52] U.S. Cl. .................................................... 198/789
[58] Field of Search ............................. 198/781, 789; 193/35 MD

[56] References Cited

FOREIGN PATENT DOCUMENTS

| 674955 | 7/1979 | U.S.S.R. | 193/35 MD |
| 874678 | 10/1981 | U.S.S.R. | 198/781 |
| 893739 | 12/1981 | U.S.S.R. | 198/789 |

Primary Examiner—Joseph E. Valenza
Attorney, Agent, or Firm—Charles E. Baxley

[57] ABSTRACT

Disclosed herein is a transport device for piece goods or the like, having rolling members (5) which directly support the piece goods. The rolling members (5) are arranged partly below a plate member which may be a unitary plate or segments (1) which supplement each other in plate-like manner. The rolling members (5) are supported on rolling drive devices and are guided in holes (3) in the plate member. The top portions of the rolling members (5) protrude above the top of the plate member and are arranged in linear rows (7) transverse to the direction of the transport. The transport device is a linear conveyor device which has simple drive devices, insensitive to heavy loads, on the rolling members (5) and, accordingly, can be driven over also by vehicles without the lowering of the rolling members (5). This result is achieved by providing the rolling drive devices in the form of cylindrical shafts (8) one of which is mounted centrally below each row (7) of rolling members (5) and parallel thereto.

1 Claim, 3 Drawing Figures

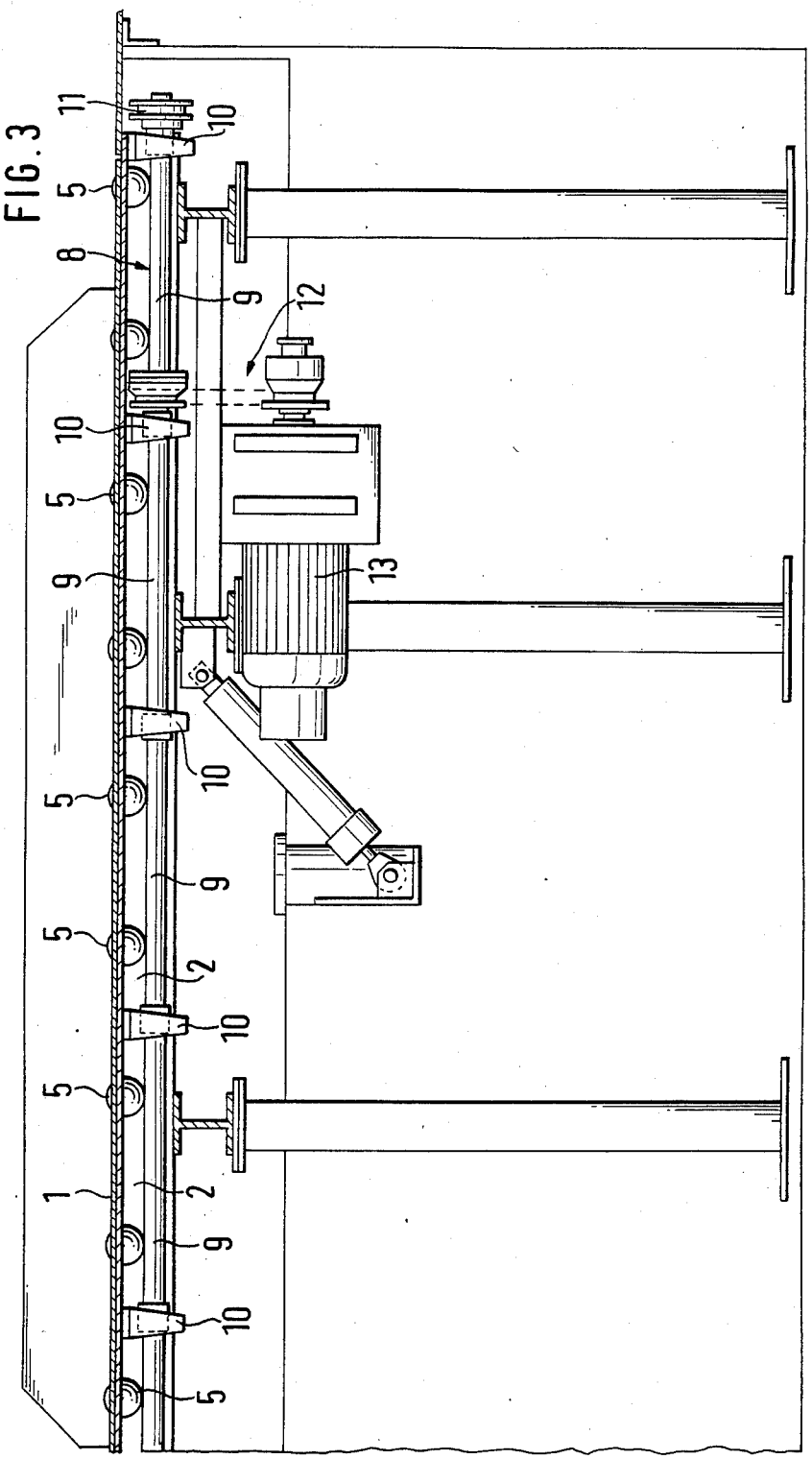

TRANSPORT DEVICE FOR PIECE GOODS OR THE LIKE

BACKGROUND OF THE INVENTION

The present invention relates to a transport device for piece goods or the like, of the type comprising rolling members which support the piece goods, a plate member having holes positioning rolling members with their tops protruding above the top of the plate member and in linear rows transverse to the direction of transport, and rolling drive devices below the plate member and supporting the rolling members.

Such a prior transport device is known from Federal Republic of Germany AS No. 22 61 936; which discloses a conveyor-path switch for transferring piece goods from a first conveyor onto at least one second conveyor which travels in a direction different from that of the first conveyor. In such conveyor-path switches it is important to be able to change the direction of conveyance of the piece goods. This requires complicated drive devices for the rolling members (balls). For this purpose, the individual drive devices consist of drive disks which are rotatable parallel to the surface of conveyance and on which one of the rolling members rests eccentrically at all times, all the drive disks being arranged for rotation on a common mounting plate. The plate, which has passage openings for holding the rolling members, is arranged fixed in space. By displacing the mounting plate with respect to the upper plate which holds the balls, the direction of conveyance of the rolling members can be varied within wide ranges.

This known conveyor-path switch is too expensive to be used as a linearly conveying transport device. It is therefore used only as a short transfer deck.

For linearly conveying transport devices two other systems have been used up to now. In one of these, there are roller tables which are arranged displaceable vertically, below an upper plate, arranged fixed in space, having passage openings for the individual rollers. In the lowered condition of the roller table, the top side of the upper plate can be driven over by vehicles such as fork trucks, hand elevating trucks or the like, without the individual rollers of the roller trains being overloaded by spot loading from the wheels of the vehicle. However, with this transport system, the drive of the individual rollers, which are seated on shafts, is cumbersome and is made additionally difficult by the lift device. Furthermore, the cutouts in the surface of the upper plate, which are open in the lowered condition of the roller table, represent a place of danger, in addition to which dirt and larger particles can enter into these openings when the rollers are lowered, thus impairing the operation of the lift device as well as the rollers themselves.

In the other of these known linear transport systems, so-called "pull carpets", driven by guide drums, are pulled over a slide surface. Very high frictional forces are present between the carpet and the slide surface, which forces make high drive powers necessary and are responsible for rapid wear of the carpet material. Furthermore, the carpet material does not withstand partial loadings resulting, in particular, from sharp edges on the piece goods.

SUMMARY OF THE INVENTION

An important object of the present invention is, therefore, to provide a conveyor device of the type in question as a linear conveyor device which has simple drive devices for the rolling members, in which the drive means is insensitive to heavy loads and accordingly capable of even being traveled over by vehicles without lowering the rolling members.

This object is achieved, in accordance with the invention, in a transport device of the type in question, by providing the drive devices in the form of cylindrical shafts, which are mounted centrally below the rows of rolling members and parallel thereto.

The particular advantage of a transport device in accordance with the invention is that the rolling members which rest on the shafts can take up high vertical forces and lead them away via the drive shafts which are arranged on their bottoms. In drive-over operation the rolling members are merely stopped and no disturbing cutouts are produced in the top of the plate into which dirt or other disturbing particles could penetrate. Via the frictional lock with the drive shafts, the rolling members can be locked in standstill so that no skidding-out effects can occur as in the case of ball conveyor trains with non-driven balls.

Preferably, balls are used as rolling members in the transport device. They have particularly favorable drive-over properties.

The shafts bearing the rolling members can be mounted on specially stiffened transverse supports and the shafts can, with suitable intermediate support from below, extend over the entire length of a row of balls transverse to the direction of transport. The shafts are driven by drive wheels arranged on the outside, such as sprocket wheels or toothed-belt wheels, in order to assure synchronous driving of the rolling members and to make possible connection to a central drive motor.

Further advantageous features of the invention will appear hereinafter.

DESCRIPTION OF THE DRAWING

One embodiment of the invention will be described in further detail below with reference to the drawing, in which:

FIG. 3 is a cross section through this region of the transport device.

DESCRIPTION OF THE INVENTION

Figure 1:
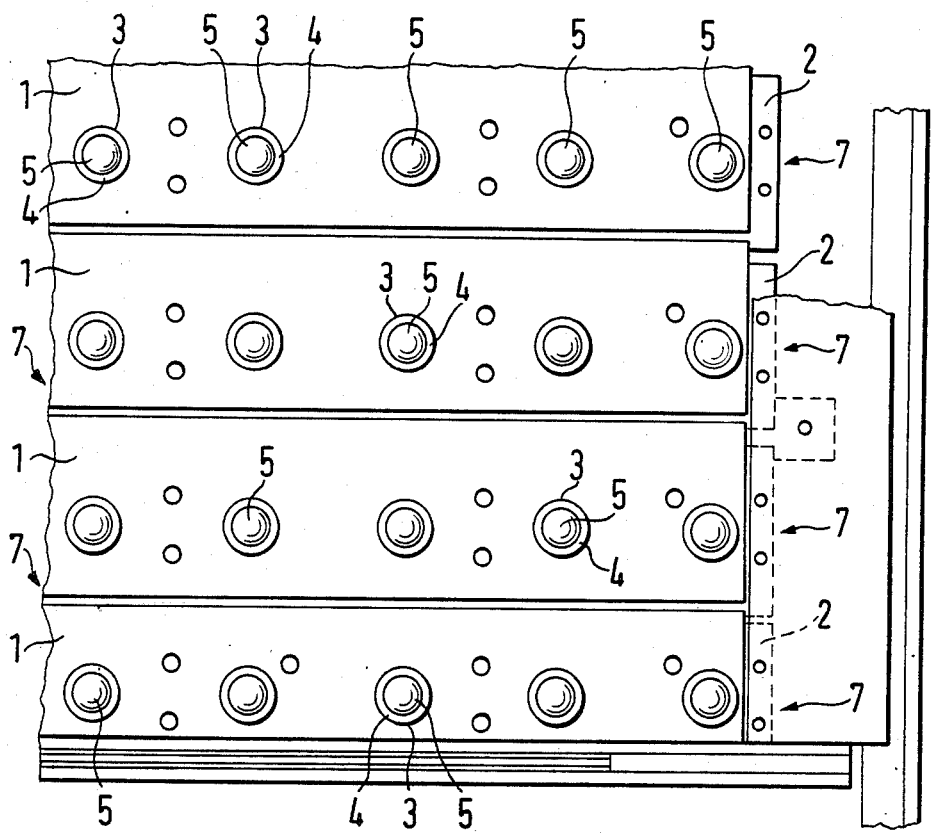
FIG. 1 is a top view of a portion of a transport device embodying the invention.

The drawing shows a plate member comprising plate-shaped segments 1 which are arranged transverse to the direction of conveyance of the transport device. On their bottom the segments 1 are firmly attached to supports 2 of U-shape in cross section so as to obtain sufficient resistance to bending of the segments 1. The upper sides 6 of the segments 1 are flush with each other so as to form a closed top side of the transport device which can be driven over by vehicles. The plate member could be a continuous plate instead of the individual stiffened plate segments 1.

In the segments 1 and the supports 2 there are provided holes 3 which extend vertically from top to bottom and supplement each other to form linear rows extending transverse to the direction of transport. Into each of the holes 3 there is inserted a guide sleeve 4 which terminates flush with the top side 6 of the segment 1. Each guide sleeve 4 receives a rolling member which is shown as a ball 5. The top sides of balls 5 protrude above the upper sides 6 of the plate segments 1. Corresponding to the configuration of the holes 3, the balls 5 also form rows 7 arranged transverse to the direction of transport and which, in the embodiment shown, are parallel to each other but, in principle, could also be arranged at an angle to each other.

Figure 2:
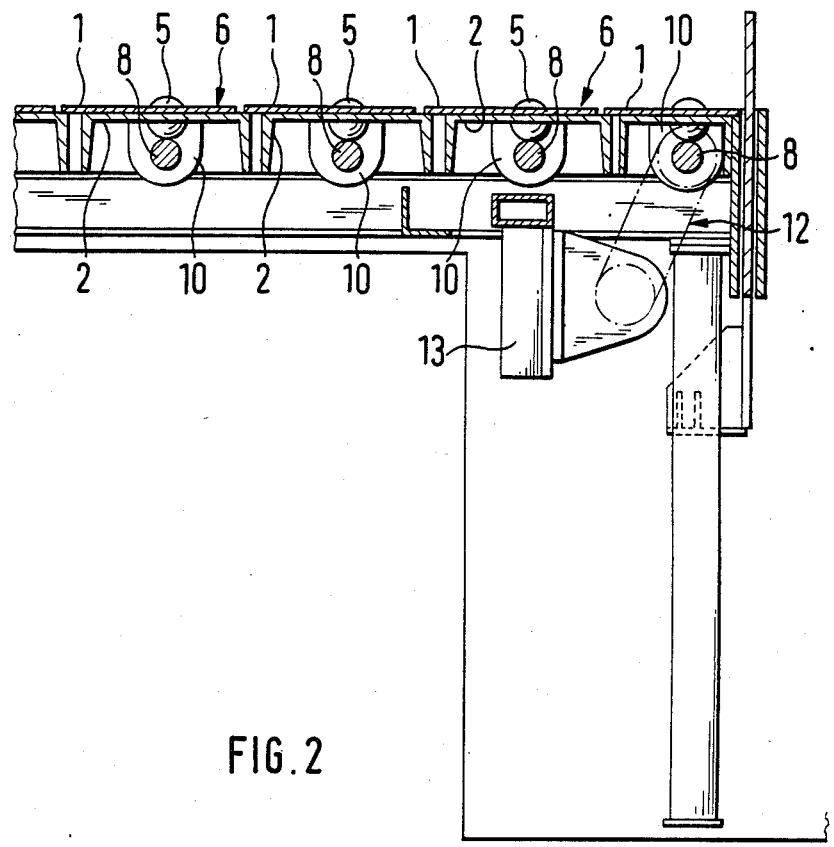
FIG. 2 is a longitudinal section through the part of the transport device shown in FIG. 1.

As can be noted in particular from FIGS. 2 and 3, all balls 5 of a row 7 of balls rest on a cylindrical shaft 8 which is arranged below the segments 1 between the U-flanges of the transverse supports 2. The axis of the shaft 8 is parallel to the line connecting the center points of the balls 5 of a row 7, for which reason, due to the linear alignment of the rows 7 of balls, the center points of the balls 5 lie in the vertical plane passing through the axis of their corresponding shaft 8. The holes 3 and the sleeves 4 have their axes arranged at right angles to the axis of the shaft 8 and hold the individual balls 5 firmly in the central alignment of the shaft 8 even upon rotation of the shaft.

Each of the shafts 8 is divided into individual sections 9 which are preferably of equal length and between every two of which there is a support element 10 which is firmly connected to the corresponding transverse support 2. On each of the shaft sections 9 there are mounted in each case two balls 5, the distance from the individual balls 5 to the corresponding adjacent support element 10 being equal to half the distance of the neighboring balls 5 from each other. Since the balls 5 can only transmit all the vertical forces which occur to the shaft 8, an optimum distribution of load over the shaft 8 is obtained.

On one longitudinal side of the transport device, drive wheels 11 such as sprocket wheels or toothed-belt disks are placed on shaft ends which are extended beyond the corresponding end support elements 10, and they connect all or at least several of the shafts 8 in slip-free manner to each other by suitable chain or toothed-belt drives. One of these shafts 8 is connected via another intermediate drive 12 to a central drive motor 13, arranged at the bottom in the frame of the apparatus.

The invention is well suited to the attainment of the stated objects and advantages and others.

The disclosed details are exemplary only and are not to be taken as limitations on the invention except as those details are included in the appended claims.

What is claimed is:

1. A transport device for piece goods or the like, having rolling members (5) for directly supporting the piece goods and arranged partly below a plate member comprising a plate or plate segments (1) which supplement each other in plate-like manner, and rolling drive devices below said rolling members (5) which are guided in holes (3) in the plate or plate segments (1), the rolling members (5) having their top portions protruding above the top side (6) of the plate or plate segments (1) and being arranged in linear rows (7) transverse to the direction of transport, characterized in that said rolling drive devices are cylindrical shafts (8), one of which is mounted centrally below each row (7) of rolling members (5) and parallel thereto and supports the rolling members (5) of the corresponding row (7) in direct rolling frictional engagement therewith, characterized in that the shafts (8) extend over the entire length of the corresponding row (7) of rolling members (5) and the transport device further comprises support elements (10) which multiply support the shafts (8) and which lie one behind the other in axial direction, and further characterized in that the transport device comprises shaft sections (9) lying between the support elements (10) and two rolling members (5) are supported in each case on the shaft sections (9).

* * * * *